May 7, 1957  E. G. JOHNSTON  2,791,334
CONTINUOUS ROTARY FILTER
Filed Sept. 2, 1954

United States Patent Office 2,791,334
Patented May 7, 1957

2,791,334

CONTINUOUS ROTARY FILTER

Edward G. Johnston, Lawrenceville, Ill., assignor to Texaco Development Corporation, New York, N. Y., a corporation of Delaware Application September 2, 1954, Serial No. 453,913

4 Claims. (Cl. 210—395)

This invention relates to filtration apparatus and particularly to apparatus employed in the separation of solids from a mixture of solids and liquid by continuous filtration. More particularly, this invention relates to apparatus employed for the continuous removal of solid or precipitated wax from a mixture with liquid petroleum.

The continuous rotary filter with which this invention is concerned may comprise a hollow rotating cylinder or hollow rotating leaves with means for either creating a vacuum within the interior of the filter element or for exerting positive pressure upon the exterior thereof.

A rotary drum filter comprises a cylindrical filtering surface. The filtering surface in turn is made up of a plurality of separate, segmental compartments or sections. Each compartment or section is connected by drain pipes to a filter valve.

In operation, the rotating cylinder is partially submerged in the mixture to be filtered, the submergence being about 40 to 60 percent of the filtering surface. Solids are deposited on the submerged exterior portion of the filter surface to form a filter cake while liquid or filtrate flows through the cake and through the filter surface into the interior of the submerged filter compartment from which it is discharged through drain pipes into the filter valve and from there conducted to a filtrate receiver.

As the cylinder rotates the filter surface with the filter cake deposited upon it emerges from the filtering mixture. Upon emerging from the filtering mixture, filtration continues, coupled with washing of the filter cake, so that the mother liquor contained in the filter cake is displaced by the wash liquid and is drawn into the interior of the filter compartment from which it is discharged through the drain pipes and filter valve into suitable filtrate receivers. Washing of the exposed filter cake is effected with a wash liquid or solvent which is usually applied to the exterior of the exposed cake in the form of a spray.

After passage through the washing zone, the filter cake is subjected to drying by the passage through it of a gas. Thereafter the cake is removed from the filter surface usually by applying a slight reverse pressure to the interior of the filter element, causing distension of the filter fabric and consequent loosening of the filter cake therefrom. Complete removal of the cake is effected by a suitable deflector blade positioned in contact with the exterior surface of the filter fabric.

In large scale filter installations where the filter drum may have a diameter of about 8 to 10 feet, the interior of each segmental section or element of the filter, including the drain pipes connecting each section with the filter valve, will comprise a substantial volume, for about 1 cubic foot. There may be as many as 30 of these sections or elements. Consequently, as each section emerges from the filtering mixture the interior will be substantially filled with mother liquor which continues to discharge from the drain pipes as the filter section rotates towards the zenith in its path of travel.

The heart and perhaps the most important portion of a rotary drum filter is the filter valve or so-called trunnion valve assembly. The trunnion valve assembly is designed and adjusted to control the timing and duration of the filtering cycle, the washing cycle and the blow back or cake discharge cycle. A trunnion valve assembly is a delicately and accurately machined and assembled apparatus. It must not only be accurate in its operation but also rugged so as to withstand long periods of continuous operation. Through the trunnion valve assembly flows the mother liquor or filtrate, the wash liquid and any gas drawn through the filter cake. Also through the trunnion valve assembly there passes the blow-back gas used to pressurize a particular segment of the filter in order to aid in the discharge of the filter cake therefrom. It is apparent, therefore, that special precaution must be taken in the construction and design of a trunnion valve to insure that the above-indicated operations take place with a minimum of possible mechanical difficulty and especially that no leakage or cross flow of filtrate or blow-back gas occurs between the ports of the trunnion valve assembly.

It has been experienced in the operation of a continuous rotary filter of the type described hereinabove, especially during the initial operation of the equipment, that frequently solid foreign matter passes into the trunnion valve assembly with the result that malfunctioning occurs; for example, a nut or bolt or a metal turning or chip, or even a piece of rust may become lodged in the trunnion valve assembly, such as between the relatively moving parts thereof, with the result that these parts are scored, damaged, seized or frozen together with resulting damage to the equipment which may necessitate long and expensive repairs.

Accordingly, it is an object of this invention to provide an improved continuous rotary drum filter.

It is another object of this invention to provide a continuous rotary drum filter wherein the trunnion valve assembly is protected from injury due to solid metal particles, such as metal chips, welding burrs, and the like.

It is another object of this invention to provide an improved trunnion valve assembly particularly suited for use with a continuous rotary drum filter.

It is still another object of this invention to provide an improved trunnion valve assembly wherein positive means are provided for protecting the valve assembly from damage due to foreign solid particles.

These and other objects of this invention and how they are accomplished will become apparent with respect to the accompanying drawing wherein.

Figure 1:
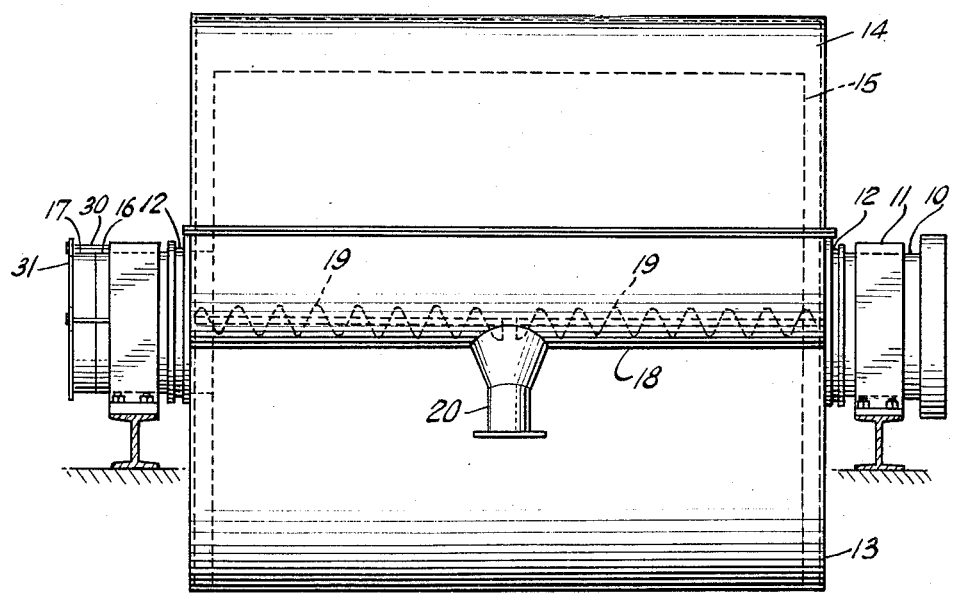
Fig. 1 is a front elevation of a rotary drum filter.

Referring to the drawing, the filter comprises a journal 10 mounted in bearings 11, the journal passing through a sleeve and stuffing box 12 at each end of a vat or tank 13 which is provided with a cover or hood 14. Mounted within the vat 13 and carried by the journal 10 to rotate therewith is the filter drum 15, which may be of conventional construction generally used in rotary drum filters of this type. The filter drum is partially submerged within the slurry to be filtered within the tank 13, the periphery of drum 15 forming the filter surface. The periphery of the drum 15 is built up of a number of segments running longitudinally of the drum, these segments being separated by suitable spacers or partitions so as to provide a large number of separate filter chambers, about the periphery of the filter drum 15. Each of these chambers is connected by at least one pipe, usually two, so-called leading and lagging pipes, extending from the chamber down into the hollow journal 10 and then running longitudinally of the journal to a valve plate 16 of the trunnion valve assembly which is indicated at the left hand portion of Fig. 1. Adjacent the valve plate 16 of the trunnion valve assembly is the stationary face plate 17.

There may be as many filtering segments or chambers as desired, e. g. thirty segments or longitudinal filter chambers, formed about the periphery of the drum 15 may be provided. Consequently, in this arrangement sixty pipes, a leading and a lagging pipe for each of the peripheral filtering chambers, extending through the hollow journal 10 and connected with suitable openings in the valve plate 16 of the trunnion valve assembly would be employed.

As indicated in the drawing, the filter cake is discharged from the filter surface of the drum 15, and falls into a trough 18 in which operates a feeding screw 19 which continuously discharges the filter cake through discharge spout 20.

Figure 2:
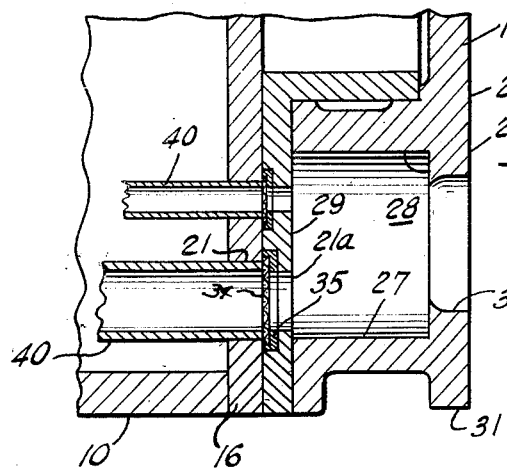
Fig. 2 is a partial vertical section view of the trunnion valve assembly suitable for use with the rotary drum filter illustrated in Fig. 1 and modified in accordance with my invention.

As illustrated in Fig. 2, the valve plate 16 is provided with openings 21 within which are fitted one end of pipe 40, the other end of which is connected to the corresponding peripheral filtering segment of drum 15. The face plate 17 is held tightly against the valve plate by means of a number of suitably spaced tie rods 30 (see Fig. 1) which fasten at one end in bearing 11, the other end passing through an opening in peripheral lugs 31 carried by the face plate and fastened therein. The lugs 31 of face plate 17 are each provided with an arcuate slot through which a tie rod 30 is inserted. By means of this arrangement the face plate 17 is to a limited extent angularly adjustable with respect to valve plate 16.

The face plate 17 is made up of circular piece 25 carrying inwardly projecting flanges 26 and 27 forming chamber 28 between the valve plate and the face plate. A number of chambers, like chamber 28, are formed between the face plate 17 and the valve plate 16, each chamber being separated by partitions not shown. The ends of flanges 26 and 27 press against a wear plate 29 which is fixed to valve plate 16. The wear plate 29 is formed with openings 21a aligned with the openings 21 in the valve plate 16 and is provided with an annular outwardly projecting flange 28 which slidingly fits within the inside of annular flange 26 which acts as a sleeve bearing therefor. As illustrated, pipe openings 21 are connected to the pipes 40 located within the journal 10 and leading to the corresponding peripheral filter segments.

The wear plate 29 which is made of relatively soft metal such as brass thus receives the sliding engagement between the rotating valve plate 16 and the stationary face plate 17. The face plate 17 is provided with suitable openings such as a lower suction or filtrate discharge opening 32 communicating with chamber 28. Other suitable openings, such as an upper suction opening or wash filtrate discharge opening (not shown), are also provided by face plate 17.

In accordance with this invention, the openings 21a in the wear plate 29, which as indicated hereinabove are in alignment with the corresponding openings 21 in valve plate 16, are recessed on that side adjacent and abutting valve plate 16. Within these recessed portions of openings 21a there is provided a foraminous member or screen 34 suitable for preventing solid particles, such as metal turnings and the like, from passing through openings 21a into chamber 28.

A foraminous member may be installed within opening 21a of wear plate 29 in the following manner. The openings 21a are recessed to a suitable depth so as to receive a metal ring 35 such as a brass or copper ring, over one end of which is soldered a metallic screen 34, such as a copper screen of 150 mesh. The entire surface of the wear plate 29 which is fixed against valve plate 16 is machined or lapped in to conform to and match the opposing adjacent surface of valve plate 16 to provide a very smooth surface in order to insure a fluid-tight fit between the wear plate 29 and valve plate 16. By installing these screens in the above-indicated manner all the liquid from the filter passing through the trunnion valve assembly must pass through these filter screens thereby positively preventing foreign metal particles from wedging between the wear plate 29 and the face plate 17. External or internal liquid leakage and external or internal leakage of blow-back gas within or from the trunnion valve assembly is advantageously prevented and avoided by installing the screens in this manner. At the same time the screens can be readily removed and the wear plate 29 is positively protected from damage.

In the operation of the filter when dewaxing mineral oil, tank 13 is filled with chilled wax slurry to be filtered until the drum 15 is substantially half submerged. Suction is provided by suitable connections leading to the interior of the filter segment or enclosing hood 14 may be filled with a gas under pressure, so as to give either continuous vacuum or continuous pressure filter operation. Accordingly the submerged portion of the filter drum constitutes the pickup or cake forming portion of the filtering cycle.

In operation, as the filter drum 15 rotates a cake of wax will be built upon that portion thereof submerged in the wax-oil slurry. Upon emerging from the liquid slurry, the wax cake is suitably washed with chilled wash solvent and may be suitably dried by drawing gas from the gaseous atmosphere within the hood through the cake by suction applied through suitable openings in the trunnion valve assembly. As the filter drum continues to rotate past the cake drying zone, it is discharged by blow-back gas, assisted by a suitable deflector blade or scraper.

In the rotary drum filters the stationary face plate is sometimes provided with three separate, arcuate zones or chambers 28 opposite the corresponding pipe openings of the trunnion valve assembly. One of these chambers, usually located at the bottom, controls the pickup portion of the cycle, the second chamber controls the cake washing and drying portion of the cycle and the third chamber controls the blow back or cake discharge portion of the cycle. Adjustment of the face plate with respect to the valve plate alters the location of these various zones with respect to the valve plate and accordingly influences the overall filtering operation.

Obviously, many variations and modifications of the invention as set forth hereinabove may be made without departing from the spirit and scope of this invention.

I claim:

1. A continuous rotary drum filter comprising in combination a drum having a peripheral filtering surface and a plurality of separate longitudinally extending filter chambers formed within the periphery thereof beneath the filtering surface, a hollow journal rotatably supporting said drum, a rotary valve plate carried by said journal adjacent one end thereof, a plurality of pipes extending from said filter chambers through said hollow journal to said valve plate, there being at least one pipe and a corresponding opening therefor through said valve plate for each of said filter chambers, a stationary face plate adjacent said valve plate, said valve plate being rotatably moveable with respect to said face plate, a wear plate fixed to said valve plate and interposed between said valve plate and said face plate, said wear plate being provided with openings therethrough in alignment with and corresponding to the openings provided in said valve plate, said face plate forming with said wear plate a passageway provided with fluid connections adapted to communicate with said openings of the valve plate and the wear plate to provide zones of cake forming, cake washing and cake discharge for said filter, a foraminous member located in each of the openings provided in said wear plate to prevent solid particles from passing through said openings in said wear plate into said passageway.

2. An apparatus in accordance with claim 1 wherein each of said openings in said wear plate is recessed to receive said foraminous member.

3. An apparatus according to claim 2 wherein said foraminous member comprises a ring upon which is fastened a metal screen.

4. An apparatus according to claim 1 wherein said wear plate is lapped in with respect to that side of said valve plate against which it is fixed to provide a fluid-tight fit therebetween.

References Cited in the file of this patent

UNITED STATES PATENTS

| | | |
|---|---|---|
| 948,477 | Diver | Feb. 8, 1910 |
| 1,005,366 | Tousley | Oct. 10, 1911 |
| 1,358,595 | Stock | Nov. 9, 1920 |
| 2,186,289 | Gee | Jan. 9, 1940 |
| 2,189,594 | Schoenfield | Feb. 6, 1940 |
| 2,530,283 | Brown | Nov. 14, 1950 |
| 2,603,231 | Birkemeier | July 15, 1952 |